US007031722B2

(12) United States Patent
Naghian

(10) Patent No.: US 7,031,722 B2
(45) Date of Patent: Apr. 18, 2006

(54) METHOD FOR POSITIONING A MOBILE STATION

(75) Inventor: Siamäk Naghian, Espoo (FI)

(73) Assignee: Nokia Corporation, Espoo (FI)

(*) Notice: Subject to any disclaimer, the term of this patent is extended or adjusted under 35 U.S.C. 154(b) by 617 days.

(21) Appl. No.: 10/014,777

(22) Filed: Oct. 29, 2001

(65) Prior Publication Data
US 2002/0086682 A1 Jul. 4, 2002

Related U.S. Application Data

(63) Continuation of application No. PCT/EP99/03089, filed on May 5, 1999.

(51) Int. Cl.
H04Q 7/20 (2006.01)

(52) U.S. Cl. .............. 455/456.1; 455/456.5; 455/404.2; 455/67.11; 342/457

(58) Field of Classification Search ............ 455/456.1, 455/456.2, 456.6, 404.2, 67.11; 342/357.01, 342/357.08, 357.1
See application file for complete search history.

(56) References Cited

U.S. PATENT DOCUMENTS

| 4,639,900 | A |   | 1/1987  | Gustafson                      |
|-----------|---|---|---------|--------------------------------|
| 4,799,062 | A | * | 1/1989  | Sanderford et al. ...... 342/450 |
| 5,293,645 | A | * | 3/1994  | Sood ................... 455/456.2 |
| 6,006,097 | A | * | 12/1999 | Hornfeldt et al. ...... 455/456.2 |
| 6,028,551 | A | * | 2/2000  | Schoen et al. ......... 342/357.16 |
| 6,100,842 | A | * | 8/2000  | Dreier et al. .......... 342/357.08 |
| 6,125,279 | A | * | 9/2000  | Hyziak et al. .......... 455/445 |
| 6,167,266 | A | * | 12/2000 | Havinis et al. ......... 455/433 |
| 6,201,497 | B1| * | 3/2001  | Snyder et al. ......... 342/357.06 |
| 6,339,709 | B1| * | 1/2002  | Gladwin et al. ........ 455/115.1 |
| 6,356,763 | B1| * | 3/2002  | Kangas et al. .......... 455/456.1 |
| 6,477,353 | B1| * | 11/2002 | Honda et al. ........... 455/11.1 |

FOREIGN PATENT DOCUMENTS

| EP | 0588598 A1    |   | 3/1994 |
|----|---------------|---|--------|
| WO | WO 9601531 A2 | * | 1/1996 |
| WO | WO 98/10307   |   | 3/1998 |
| WO | WO 9810307 A1 | * | 3/1998 |
| WO | WO 98/14018   |   | 4/1998 |

OTHER PUBLICATIONS

Universal Mobile Telecommunications System (UMTS); UMTI Terrestrial Radio Access (UTRA); Concept evaluation (UMTS 30.06 version 3.0.0); European Telecommunication Standard Institute. Dec. 1997 p. 144-173.

* cited by examiner

Primary Examiner—Charles N. Appiah
Assistant Examiner—Bryan Fox
(74) Attorney, Agent, or Firm—Squire, Sanders & Dempsey, L.L.P.

(57) ABSTRACT

The present invention is directed to a method for locating a mobile station, comprising the steps of using fixed transmitting stations for locating a target mobile station by transmitting a measurement signal from each fixed transmitting station to the mobile station, using a relay station which is adapted to receive the measurement signal from the corresponding fixed transmitting station and to forward the signal to the target mobile station, in case a direct transmission from one or more of the fixed transmitting stations is not available, and determining the distance between the target mobile station to the fixed transmitting stations and/or the relay stations on the basis of the measurement signal, and locating the position of the target mobile station on the basis of the determined distances. By this method, it is possible to locate a mobile station even if there is no direct connection via air to neighbouring base stations.

18 Claims, 8 Drawing Sheets

METHOD FOR POSITIONING A MOBILE STATION

This is a continuation of application Ser. No. PCT/EP99/03089, filed May 5, 1999.

FIELD OF THE INVENTION

The present invention relates to a method for locating a mobile station, and especially to a method for locating a mobile station in WCDMA (Wideband Code Division Multiple Access).

BACKGROUND OF THE INVENTION

There are several methods that have been developed for mobile station (MS) location determining. Among others, Time Of Arrival (TOA), Time Difference Of Arrival (TDOA), and Enhanced Observed Time Difference (E-OTD) are the most potential ones. Some of this methods like TOA and E-OTD have already been potential candidates for the T1P1 specification work.

As far as the WCDMA (Wideband Code Division Multiple Access) system is in question, the dynamic range of coverage availability is a critical problem while applying existing positioning methods (methods for locating the position) in the system. Practically, the links between the mobile station (MS) and the base station (BS), which are essential for MS positioning calculation, aren't always available or the quality levels of the transmitted signals aren't in the requested level. That is the case e.g. in some rural area due to coverage unavailability or in urban and indoor area due to shadowing and the so-called NLOS (Not Line of Sight). In the worst case, a mobile station MS is not even within the coverage of any of the related base stations due to the so-called near-far problem which is caused by slow and fast fading and intra/inter cell interference in the system environment.

FIG. 1 illustrates a very typical problem of the cellular MS positioning in WCDMA system. In FIG. 1, three base stations BS1 to BS3 serving for three cells C1 to C3, respectively, are shown. The coverage of the corresponding cells of the base stations differ between a reduced cell's coverage and an extended cell's coverage, as indicated in FIG. 1. Furthermore, three mobile stations MS1 to MS3 are shown which are situated at different positions within and without the coverage of the cells. The positions of the mobile stations are indicated by an 'X' in the figure.

In order to determine the positioning of a mobile station the LOS (Line Of Sight) of three base stations are necessary for most of existing algorithms. As it is shown in FIG. 1, the mobile station MS1 has lost the LOS to all of the three base station BS1 to BS3. The mobile station MS2 isn't within the original coverage of any of the base stations, but not far away from the border. On the other hand, the mobile station MS3 is such close to the base station BS3 that the receiving signal with satisfied SIR (Signal to Interference Ratio) level from other base stations is almost impossible or it is contradictory with overall system performance. Indeed, the situation of the mobile station MS3 may be the most usual and critical situation concerning the MS positioning while algorithms like TOA, TDOA are applied.

In comparison with GSM, another specific problem is related to the transmitted power or the level of the interference due to MS positioning. The less the interference caused by mobile positioning is, the better is the capacity and overall system performance for the WCDMA system.

From system architecture point of view, there should be entity(s) that take care of the allocated power/interference for MS positioning purposes and its effect on the system's overall power/interference situation. Moreover, the functional allocation and their implication for the system interfaces should be determined.

The most potential solution for above-mentioned problems is using the DTX (discontinuous transmission) feature of base stations. For instance, in FIG., 1, for the case of the mobile station MS3, transmission of the serving base station BS3 can be stopped for certain time so that the mobile station MS3 does location measurements from signals of neighbouring base stations (here BS1 and BS2) during the idle slot.

However, even using this solution causes remarkable additional interference to the system and ultimately reduces the overall system capacity by changing the power/interference level in the system and making it unstable. Furthermore, in the case of the situation of the mobile station MS1 or the mobile station MS2 illustrated in the FIG. 1, this would be an even more problematic solution.

SUMMARY OF THE INVENTION

Thus, the object underlying the invention is to provide a method for locating the position of a mobile station which is able to reliably locate the position of the mobile station also in a case that no direct connection to a base station is possible.

This object is solved by a method for locating a mobile station comprising the steps of using fixed transmitting stations for locating a target mobile station by transmitting a measurement signal from each fixed transmitting station to said mobile station, using a relay station which is adapted to receive said measurement signal from the corresponding fixed transmitting station and to forward said signal to said target mobile station, in case a direct transmission from one or more of said fixed transmitting stations is not available, and determining the distance between said target mobile station to the fixed transmitting stations and/or the relay stations on the basis of said measurement signal, and locating the position of said target mobile station on the basis of the determined distances.

By the above method, it is possible to locate a mobile station even if there is no LOS (Line of Sight), i.e., a direct connection via air, to neighbouring base stations.

Moreover, by the method according to the present invention it is possible to locate a mobile station by one or two LOS (Line of Sight) from neighbouring base stations without any special antenna or additional complexity to the mobile station or the base station.

Furthermore, the interferences due to a positioning process are reduced. This is a vital issue for WCDMA, since WCDMA is a very interference dependent multiple access.

Further advantageous developments are defined in the dependent claims.

BRIEF DESCRIPTION OF THE DRAWINGS

The present invention will be more readily understood with reference to the accompanying drawings in which.

DETAILED DESCRIPTION OF PREFERRED EMBODIMENTS

In the following, a preferred embodiment of the invention is described in more detail with reference to the accompanying drawings.

The most important characteristic of the invention is to use the cellular relay technique like Opportunity Driven Multiple Access (ODMA) to deal with the previously mentioned problems and at the same time to minimize the capacity reduction of the system due to mobile positioning service.

ODMA is a mechanism for maximizing the potential for effective communication. This is achieved by distributing intelligence within communicating nodes and providing multiple communication paths between them. The intelligent nodes measure and evaluate their communications options and adapt to exploit the optimum opportunity. The WCDMA is sufficiently flexible to support relaying with negligible increase to the MS complexity or cost. WCDMA can therefore offer the flexibility of simple relaying but also provide a suitable platform for advanced relay protocols such as ODMA.

Figure 1:
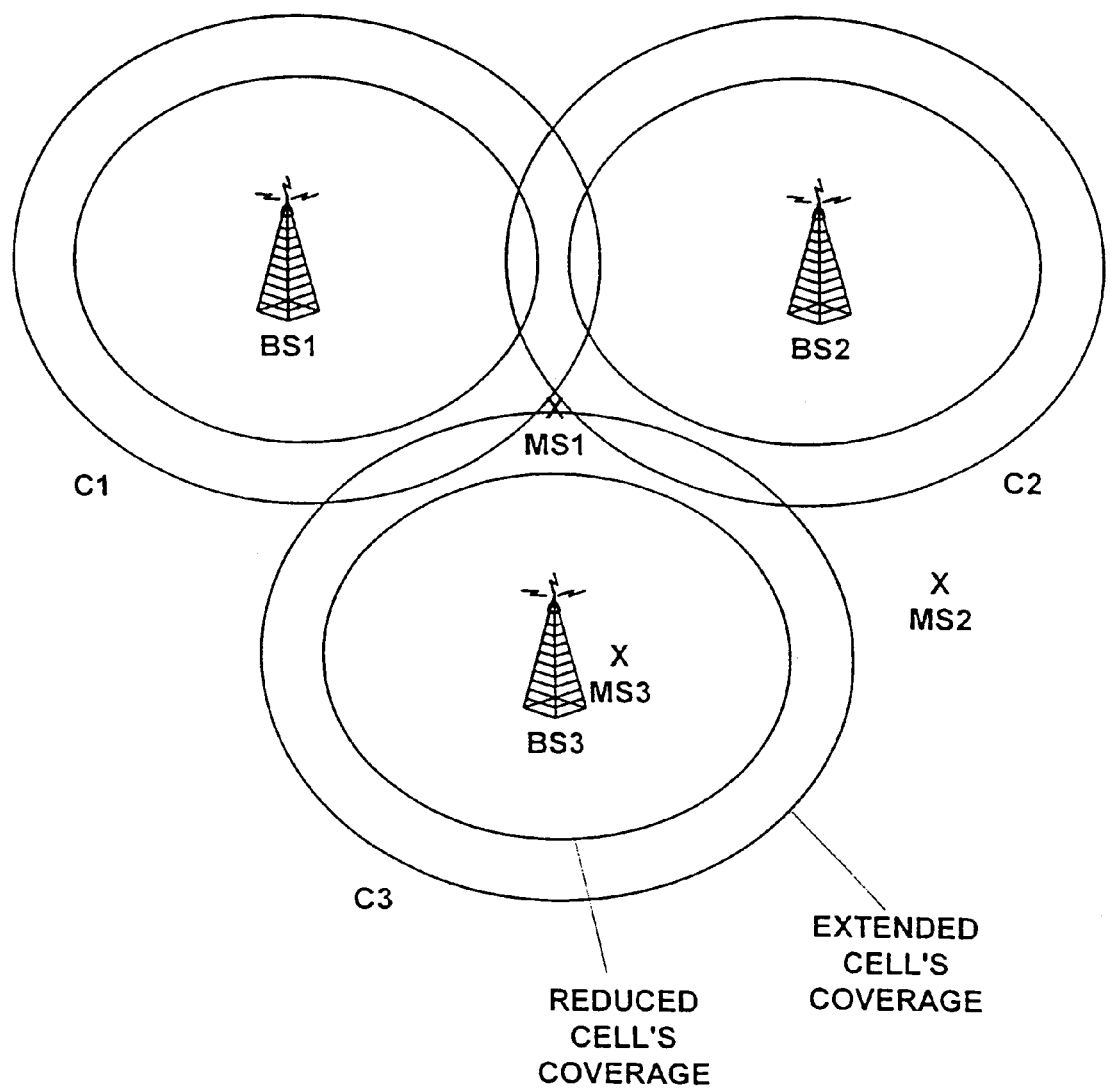
FIG. 1 illustrates the specific problem of positioning a mobile station in WCDMA environment.

The basic approach of the invention can be figured out by describing some of the most usual cases as were shown in FIG. 1.

In a first case, it is assumed that a target mobile station (in the following referred to as target MS) that is going to be located doesn't receive a required signal for positioning purposes from enough numbers of neighbouring base stations due to shadowing, fading or other factors which affect on radio wave characteristics. By utilizing ODMA like a relay technique, in every cell serving by the base station BS1 there are some seeds (i.e., fixed mobile stations that never move and are always powered on) or moving mobile stations which can act as relay nodes in the system. Relaying is used to route the data required from and to the mobile involving in the positioning process to the corresponding nodes or base stations. The relay nodes in range of the base stations will toggle between ODMA and WCDMA modes. By using intelligent relay techniques, the coverage of cell(s) can even be extended to cover the mobile stations which accommodate near the border outside the radio coverage.

Figure 2:
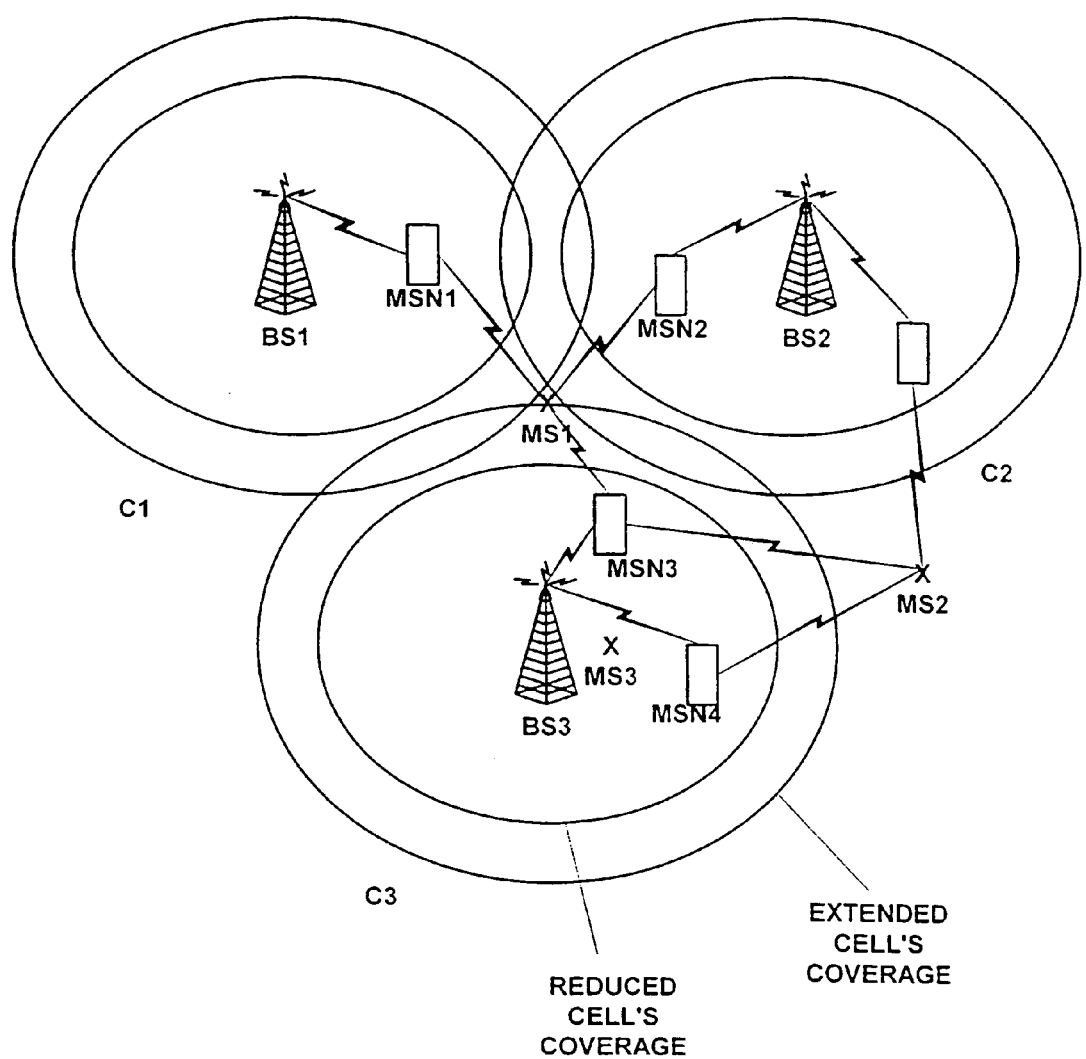
FIG. 2 illustrates LOS availability by using relay techniques in positioning a mobile station according to a first embodiment of the invention.

FIG. 2 illustrates the situation and the related approach of the invented method to locate the target MS by applying Time Of Arrival (TOA), Time Difference Of Arrival (TDOA) or any similar algorithms which required LOS (Line Of Signal) from some base stations.

In FIG. 2, in addition to FIG. 1 a plurality of mobile stations MSN1 to MSN5 are shown which serve as the above mentioned relay stations and will be referred to as mobile station node or MS node in the following, An MS node can be a movable or fixed mobile station, any element of the cellular system with a relay functionality, a positioning service provider device, or a GPS node that can be used as a reference point for the positioning process.

As shown, by utilizing relay techniques like ODMA it would be possible to provide LOS from neighbouring base stations to the mobile station that is intended to be located. At this stage, all required measurement for calculating of the mobile station location according to TOA, TDOA or similar algorithms can be obtained. It should be emphasised that the relay nodes have already the required LOS of base stations and their location or their distance from the serving base station should be determined before this process so that there will be geographical coordinates for further calculation. In addition to the basic calculations, the measurement error especially in case relay nodes are not fixed should be taken into account.

Figure 3:
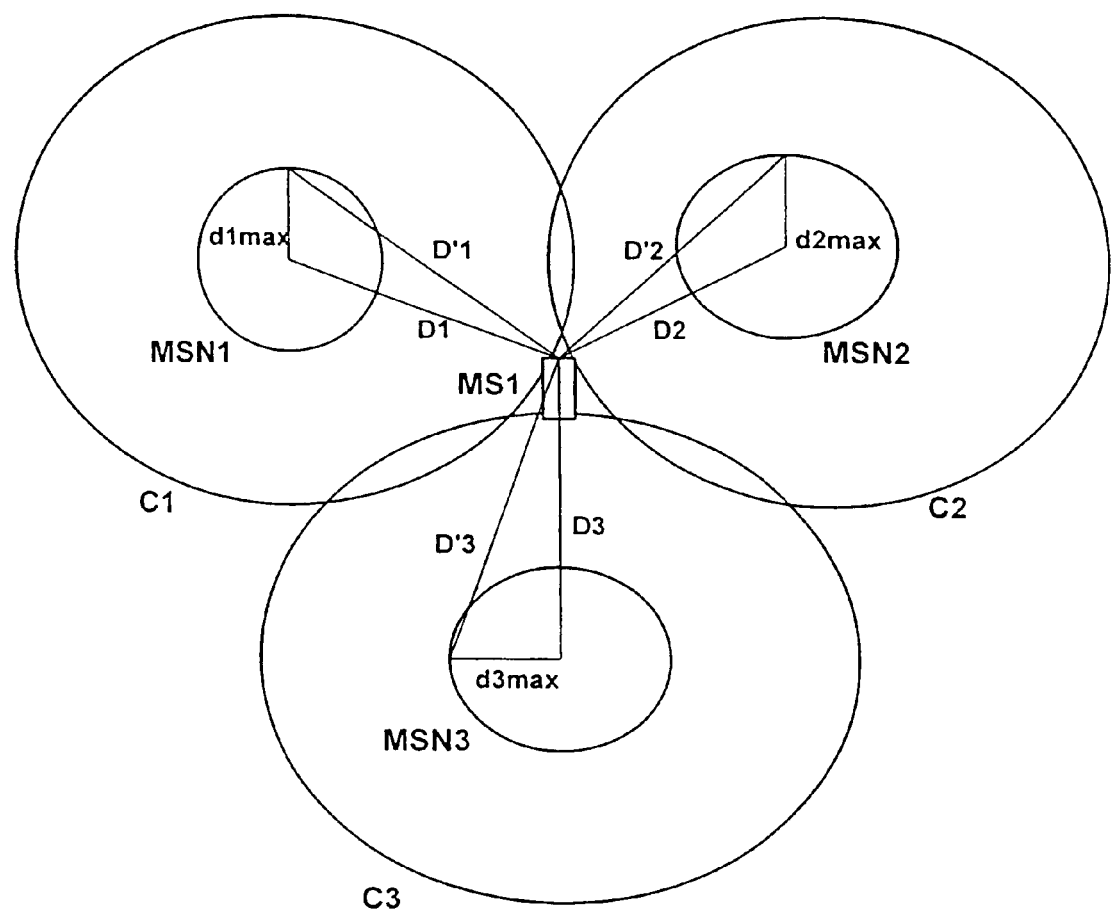
FIG. 3 illustrates a process for positioning a mobile stating by using three MS nodes according to the first embodiment of the invention.

In FIG. 3, positioning of a target mobile station MS1 by using three MS nodes MSN1, MSN2 and MSN3 is shown. The MS nodes MSNi (i=1 to 3) serve as relays, as described above. A MS node may be a mobile facilitated by any relay technique or positioning technique like GPS that enable it to be used as a reference point for positioning purposes. It can be either fixed (e.g. any client which provides positioning services) or movable (e.g. mounted in a taxi).

In FIG. 3 the parameter D1 is the distance between the MS nodes MSNi (i=1 to 3) and the mobile station MS1 that is to be located. In case the MS nodes act as seeds, i.e. they don't move, D1 can be determined according to the propagation time delay of the radio wave as used in TOA, TDOA or other similar algorithm, that is:

$$Di = c\Delta ti \quad (1)$$

Where c is the light velocity and $\Delta ti$ is the propagation delay of the radio signal between the mobile station MS1 and the MS node MSNi.

In case all nodes or any of them move, then the error due to the movement can be taken into account according to following expressions:

$$D1' = c\Delta t1 + \beta d1\ max$$

$$D2' = c\Delta t2 + \beta d2\ max \quad (2)$$

$$D3' = c\Delta t3 + \beta d3\ max$$

Where:

$$dimax = vimax\Delta t + e\ -1 \leq \beta \leq 1$$

Thus, for example in case of the MS node MSN1, the real distance D1' is approximated by using the distance D1=$c\Delta t$ which is only based on the propagation delay of the radio waves and by using the maximum distance d1max by which the MS node MSN1 can move during the propagation delay $\Delta t$. The distance dimax depends on the velocity vimax of the MS node MSNi during the propagation delay $\Delta t$. Furthermore, also a measurement error e can be taken into account. The parameter $\beta$ indicates an uncertainty of the deviation caused by the movement. In other words, as shown in FIG. 3, the real position of the MS node MSN1 can be anywhere within the circle of the radius d1max.

Alternatively, the implication of mobility of the MS node MSNi can be calculated according to following equation:

$$D'i^2 = Di^2 + dimax^2 - Di \cdot dimax \cdot \cos\alpha \quad (3)$$

where:

$$0° \leq \alpha \leq 180°$$

In this case, however, the angle α between Di and dimax has to be known. That is, a special antenna has to be provided on the MS nodes which is capable of measuring the angle between two signal components. However, in practice the distance Di is much greater than the distance dimax since. Thus, in general utilising equation (2) would is practically sufficient and easier.

Figure 4:
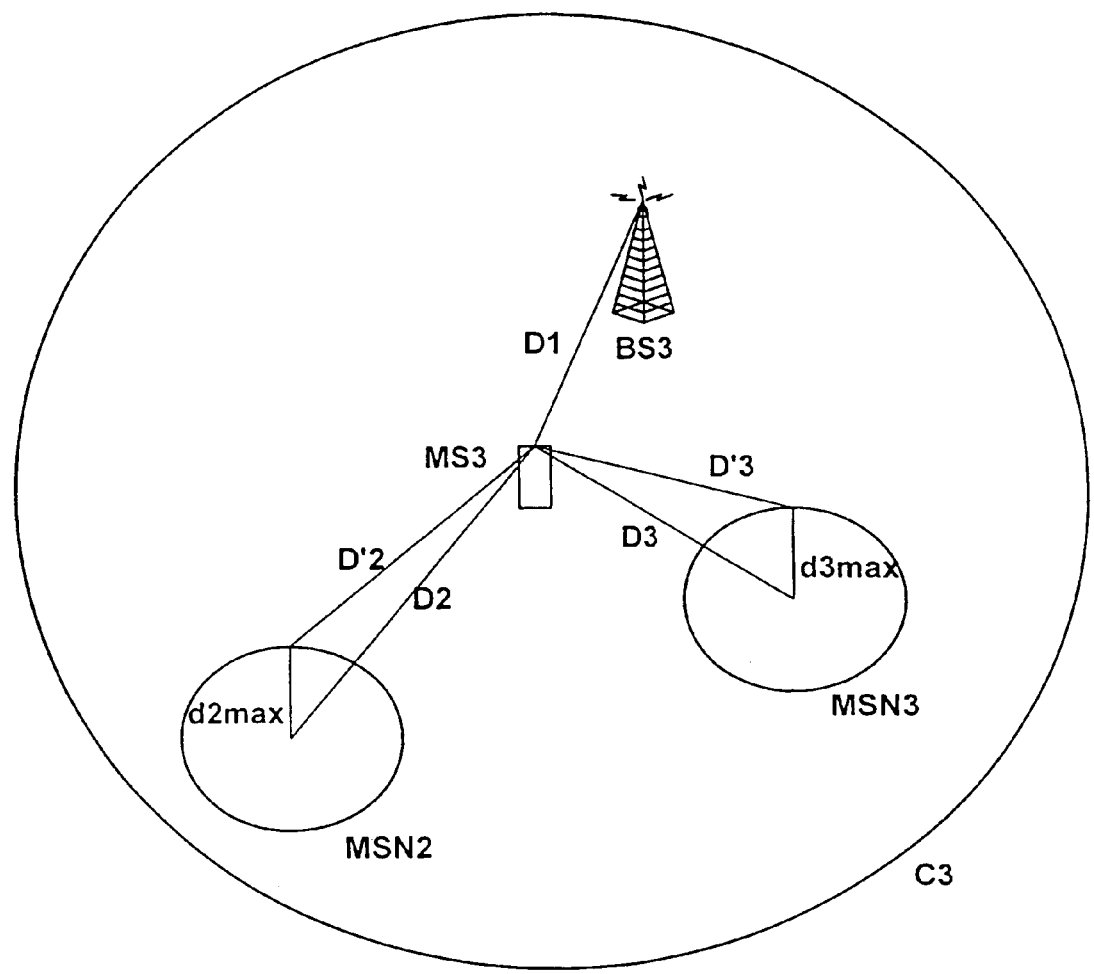
FIG. 4 illustrates use of a relay based method when only a signal of one base station is available according to a second embodiment.

Next, a second case is described. In this case positioning may requested for a mobile station which is near the serving base station BS as is the case for MS3 in FIG. 1. In order for MS3 to be located it should receive signals from neighbouring base stations but since the signal from its serving base station BS is dominant, the mobile station MS3 does not receive signals from other base stations with a desirable level for positioning purposes. In this case, as it is shown in FIG. 4, the signals of MS nodes MSN1 and MSN2 can be used to get the required LOS (Line Of Sight) for positioning the mobile station MS3.

The MS nodes can be either within the of same cell where the mobile is situated or can be in a neighbouring cell. In the former situation, as shown in FIG. 4, the location of mobile can be calculated according to equation (2). For calculating D1 however, d1max isn't necessary because the base station BS is fixed. If the MS nodes are within the neighbouring cell coverage there are two possibilities:

1. Positioning the mobile station MS3 (i.e., locating its position) by calculating its coordinates based on coordinates of the MS nodes MSN1 and MSN2 and the coordinates of the base station BS coordinates by applying equation (2).

2. Positioning the mobile station MS3 by calculating its coordinates based on coordinates of the base stations. This time it is necessary to calculate the distance between neighbouring base stations and the mobile station MS3 by using equation (3) and using the distance from the base stations to the MS nodes and from there to the mobile station and then locate the mobile stations.

It is also possible that there are two base stations signals available but the third one is missing. Due to the MS nodes, i.e. the relay based nodes, a calculation of the coordinates of the mobile station on the basis of either three base station or two base stations and one MS node by using equation (2) and (3) is possible.

Figure 5:
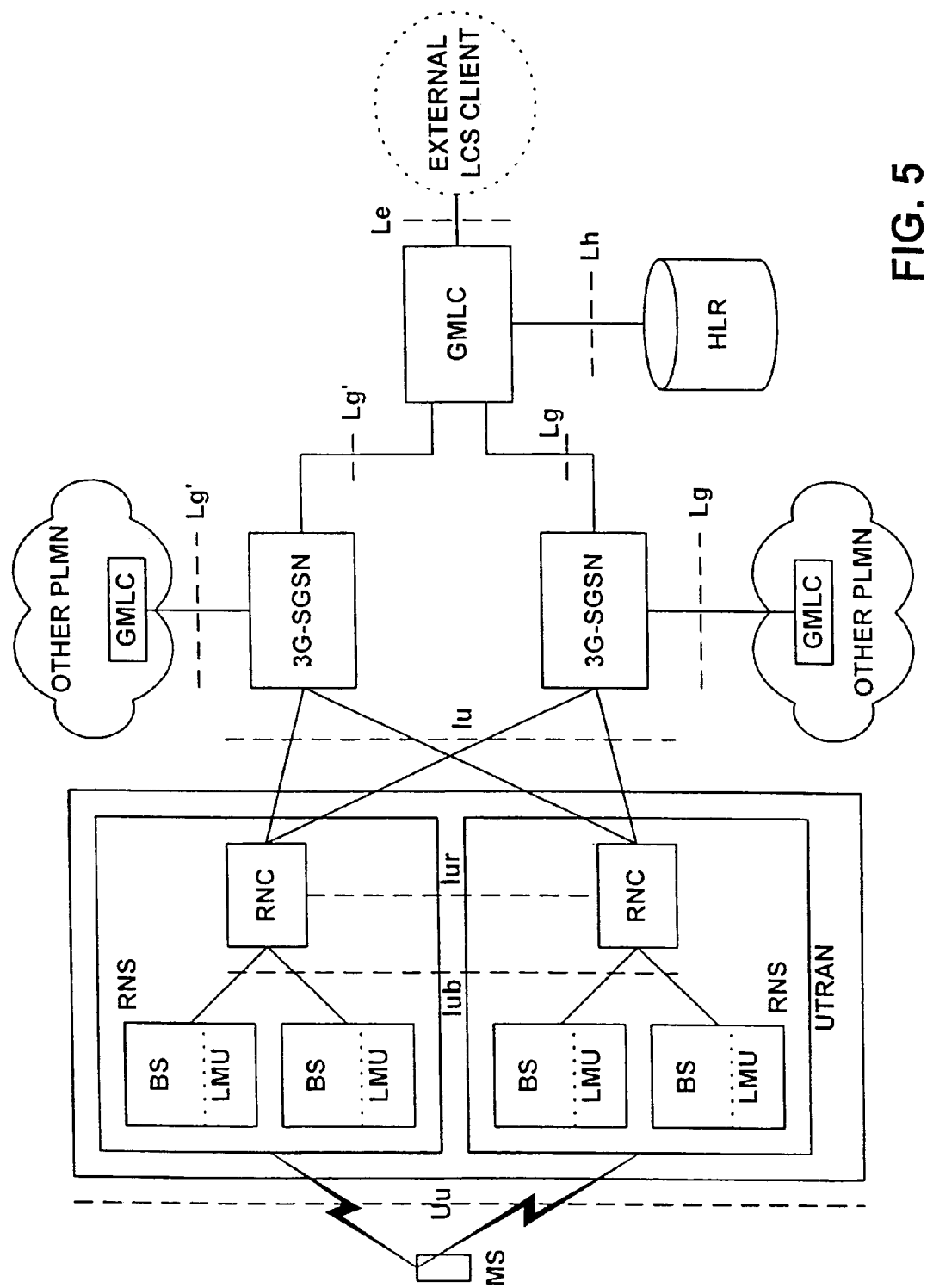
FIG. 5 shows a block diagram of a generic location service logical architecture in UMTS.

In the following, the logical architecture of LCS (Location Services) in UMTS (Universal Mobile Telecommunication System, the third generation telecommunication system) is described with reference to FIG. 5. LCS is logically implemented on the UMTS structure through the addition of one network node, the Mobile Location Center (MLC). Furthermore, it is necessary to describe a number of new interfaces. FIG. 5 illustrates the general logical architecture of LCS in UMTS. As is shown in the figure and is described in the following, some new network elements and network interfaces including a Mobile Location Center (MLC) are shown. It is to be noted that the interfaces are illustrated by a dashed line.

The basic architecture is embedded in the third generation system's general architecture. Thus, from LCS perspective, the required functionality is integrated with the functionality of the network elements like 3G-MSC, 3G-SGSN etc. In addition to that, new network elements and interfaces are specified for the LCS (Locating Service) purposes.

From logical architecture perspective, unlike GSM system, in UTMS the use of a SMLC (Serving Mobile Location Center) is neglected. Consequently the positioning calculation is fulfilled at radio network controller (RNC) of the corresponding radio access network (RAN). So, the functionality of the Ls interface (interface between SMLC and MSC in GSM LCS) is allocated to the Iu interface, which is interface between the core network CN and the radio access network RAN. In addition, according to the present embodiment, a location measurement unit LMU is integrated into the base station BS.

In the following, the network elements involved in LCS are described in more detail.

First, the Location Measurement Unit (LMU) is described. The main function of LMU is to make radio measurements including Real Time Difference (RTD), Absolute Time Differences (ATD), or any other kind of radio interface timing measurement of the signals transmitted by base stations. These assistance measurements obtained by LMU functionality in the base stations BS have a generic status in being usable by more than one positioning method. These measurements may consist of location measurements specific to one mobile used to compute the location of those mobile or assistance measurements specific to all mobiles in a certain geographic area.

All location and assistance measurements obtained by an LMU are supplied to a particular SRNC (Serving Radio Network Controller) associated with the base station BS having the LMU functionality. Instructions concerning the timing, the nature and any periodicity of these measurements are either provided by the SRNC or are pre-administered in the BS.

In GSM LOS, the LMU is a separate element from the GSM network. The communication between the GSM network and LMU is done through GSM air-interface. In UMTS LCS, the LMU functionality should be integrated in the base station. There should not be any technical restrictions to do that, at least when ISFL (Idle Slot Forward Link)-TDOA method is used.

Next, the mobile station is described. Depending on the provided positioning services, the mobile station may be involved in the positioning procedures in various levels. In addition to that, the role of the mobile station is closely related to the positioning approach used in the system. For instance, in network based positioning approach its functionality does not encompass MS location calculation whilst in mobile-based positioning approach it does.

Furthermore, the mobile station can be equipped by GPS functionality. Then, it can provide required data to/from the network (RAN) for positioning purposes.

The mobile terminal itself can request the network to determine its position (network assisted positioning).

In the following, an UMTS Terrestrial Radio Access Network (UTRAN) is described. The Serving Radio Network Controller (SRNC) which is a network element of UTRAN, contains functionality required to support LCS in one PLMN (Public Land Mobile Network). The SRNC manages the overall coordination and scheduling of resources required to perform positioning of a mobile. It also calculates the final location estimate and accuracy.

The SRNC controls a number of LMUs for the purpose of obtaining radio interface measurements to locate or help locate MS subscribers in the area that it serves. The SRNC is administered with the capabilities and types of measurement produced by each of its LMUs. Signaling between an SRNC and LMU is transferred via the Iub and in some specific period via Iur interfaces. The following measurements returned by an LMU to an SRNC have a generic status in being usable for more than one positioning method (e.g. including TOA).

Next, radio interface timing information are described. Generally, the UTRAN is involved in the handling of various positioning procedures. As a generic handling procedure, the UTRAN provides Cell ID (cell identification) and timing related data, e.g., timing advance (frame timing offset) to the 3G-MSC (Mobile service Switching Controller of the third generation). In case the 3G-SGSN (Service GPRS Support Node for Third generation) has independent mobility management, UTRAN provides Cell ID to SGSN either. The LCS parameters are included to the Iu interface.

The RAN (radio access network) level overall controlling of the LCS is the functionality of UTRAN. Thus, controlling of the e.g. IS-DL (Idle Slot Downlink) like mechanism pertains to the UTRAN's functionality. Therefore, SRNC may control such mechanisms according to pre-designed patterns or algorithms that take into account the dynamic behaviour of the network by utilizing handover, power control and load control data. The UTRAN also manages the overall coordination and scheduling of resources required to perform positioning the mobile. In the network-based positioning approach UTRAN calculates the final location estimate and accuracy.

The UTRAN controls a number of LMUs/BSs (Location measurement units/base stations) for the purpose of obtaining radio interface measurements to locate or help locate a mobile station in the serving area.

The 3G-MSC/VLR (3G-MSC, i.e., Mobile Services Switching Center for third generation or UMTS, including a Visitor Location Register) contains functionality which is responsible for mobile authorization and managing call-related and non-call related positioning requests of UMTS LCS.

Moreover, a Service GPRS Support Node (3G-SGSN) contains functionality responsible for mobile authorization and managing call-related and non-call related positioning request of UMTS LCS as far as the packed switched accesses are concerned.

For example, the 3G-SGSN can decide whether an Internet server request for the MS position is related to an ongoing MSC call related or non-call related.

In this case, the external server could request the SGSN what is the identity behind the given dynamic IP address. The mobile application could also request the telephone number from the user.

One way would be if the external server could request a Gateway Mobile Location Center (GMLC) for the position of the terminal using the given (dynamic) IP-address. The MLC (Mobile Location Center) requests SGSN for the positions by using this IP address for the terminal.

It seems that the mobile terminal should request its own position, because the external server has difficulties in identifying the user.

If the SGSN informs a DNS server of the mapping of IMSI (International Mobile Subscriber Idendity) and dynamic address, and if the DNS knows the mapping of IMSI and user logical name, then with DNS reverse interrogation, the external server could know the user logical name which is a stable ID. With a preparatory interrogation the DNS could give also logical name to IMSI mapping (or directly IP address to IMSI mapping).

The GMLC (Gateway Mobile Location Center) receives service requests from the external Client or the mobile terminal itself (network supported positioning) and activates the UMTS LCS system, if needed. It has to be noted that the GMLC basically is a gateway element which enables a connection of the network to any external client. The GMLC may request routing information from the HLR (Home Location Register) or MM (Mobile Management) of the 3G-SGSN. After performing registration authorization, it sends a positioning request to and receives final location estimates from the 3G-MSC and 3G-SGSN. Also, GMLC functionality may be integrated in the 3G-MSC or in an OMC (Operation and Maintenance Center). In case of the OMC, it is much easier to utilize the data related to positioning for network planning purposes, e.g., for optimizing handovers and the network coverage to meet the dynamic range of traffic. Furthermore, in case of a multi-network environment, i.e., a network with both GSM and UMTS, one common GMLC may be used for both of them.

The Home Location Register (HLR) contains LCS subscription data and routing information concerning the subscriber calls. The HLR is accessible from the GMLC via a MAP (Mobile Application Part) based interface.

Furthermore, the LCS Client may be any sort of service application offered by service provider or contents provider. The LCS Client is closely related to the variety of the available services. Hence, a further description thereof is omitted in this specification. For example, sometimes the mobile station MS or an service application in the mobile station is also the Client.

In the following, the network interfaces involved are described in more detail.

In addition to the implementation of the LCS for main interfaces of the UMTS system i.e. Uu, Iub, Iur and Iu, the following new interfaces are defined for the LCS purposes:

Firstly, an interface Le between the LCS Client and the GMLC is described, which is denoted with Le.

Le is the interface between Location Application and GMLC network elements. It provides the reference point for transforming of the requested mobile positioning information between the interface Le and GMLC. This information includes the positioning request and the final decision of the positioning process.

In the following, an interface Lh between the GMLC and the HLR is described. The GMLC uses this interface to obtain the routing information from the HLR. The interface Lh is a type of MAP interface and may be implemented over the SS7 (Signaling System number 7) or possibly over an IP Protocol.

In case packet data and circuit switched parts of the network use the same mobility management related database, the Lh interface supports both of them.

Next, an interface Lg between the GMLC (Home PLMN or other PLMN) and 3G-MSC network elements is described. It is used for the 3G-MSC to access to the GMLC for transforming the subscriber information needed, e.g., for authorization and positioning access routing. The interface is a type of MAP interface and may be implemented over SS7 or an IP protocol.

Moreover, an interface Lg' described. Lg' is an interface between GMLC and 3G-SGSN network elements. It is used for the 3G-SGSN to access to the GMLC (of HPLMN or other PLMN) for transforming the subscriber information needed, e.g., for authorization and positioning access routing. The interface is a type of MAP inter-face and may be implemented over SS7 or an IP protocol (MAP over IP).

In the following, a basic functional model of the LCS is presented. Although, the main architectural aspects are in generic level, the main assumption is that the TDOA or TOA like or any variations of these algorithm are used to calculate the MS location related parameters.

Figure 6:
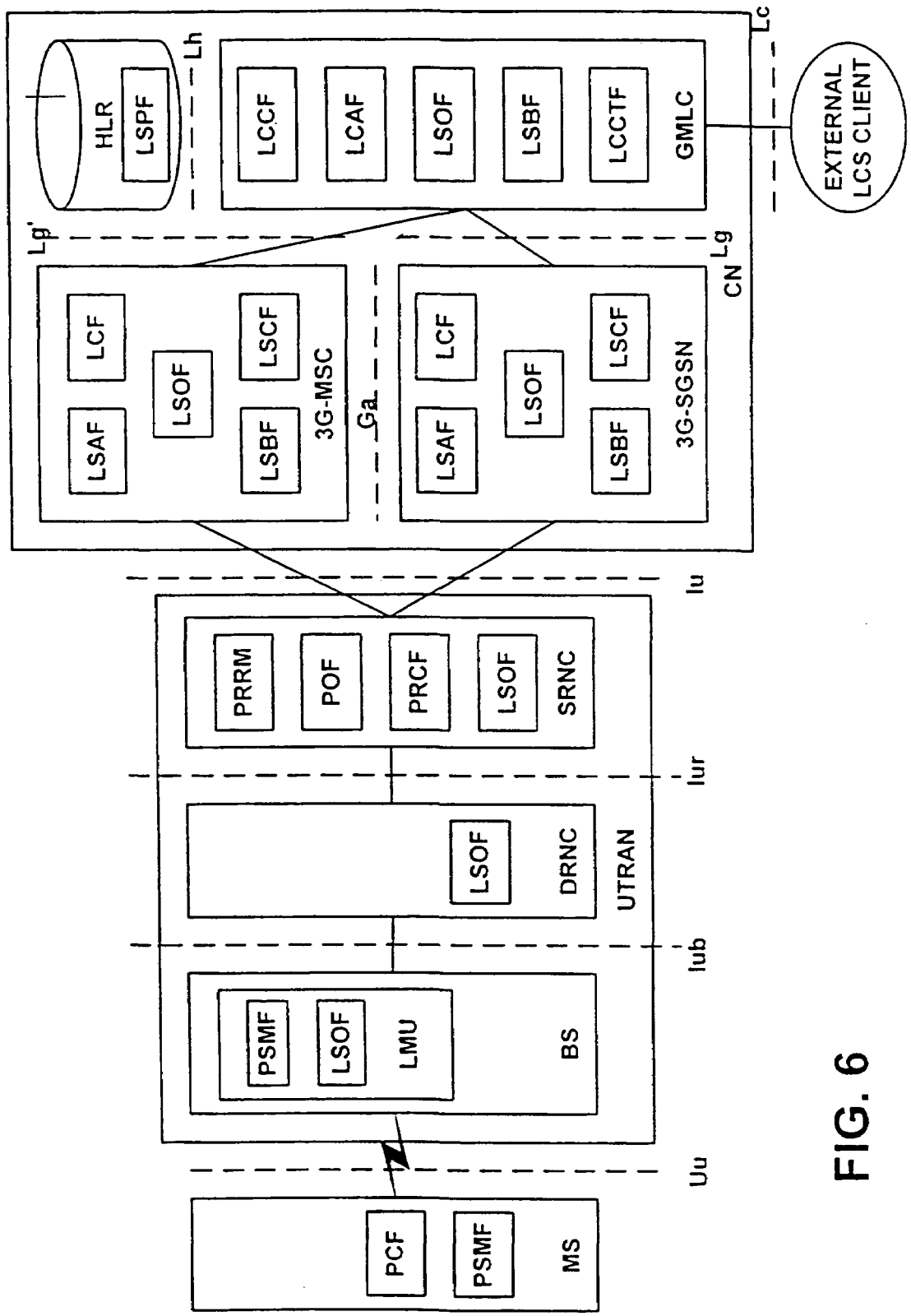
FIG. 6 shows a block diagram of a functional model and reference configuration of mobile positioning.

The LCS functional model consists of functional entities (FE) and functional interfaces (FI) which are involved in the entire functionality of the LCS. FIG. 6 illustrates the main functional entities and functional interfaces of the LCS in WCDMA system architecture. The LCS components include the following entities:

Client Handling in LCS Client,
Subscriber Handling in LCS Server,
System Handling in LCS Server, and
Client Handling in LCS Server.

An LCS client contains an LCS component with one or more client(s) which by using location information can provide location based services.

An LCS client is a logical functional entity that requests from the LCS server in the PLMN location information for one or more than one target mobile station within a specified set of parameters such as Quality of Service (QoS). The LCS Client may reside in an entity (including the mobile station) within the PLMN or in an entity external to the PLMN. The description of the LCS Client's internal logic and its relation to the external use is omitted here.

In the following, functions relating to the LCS Client are described.

The Location Client Function (LCF) provides a logical interface between the LCS client and the LCS server. This function is responsible for requesting location information for one or more than one target mobile station with a specified "QoS" and receiving a response, which contains either location information or a failure indicator.

In the following, functions related to the LCS Server are described. First, a Client handling component is illustrated.

The Location Client Control Function (LCCF) manages the external interface towards the LCF. The LCCF identifies the LCS client within the UMTS PLMN by requesting client verification and authorization (i.e. verifies that the LCS client is allowed to request a positioning of the subscriber) through interaction with the Location Client Authorization Function (LCAF). The LCCF handles mobility management for location services (LCS), e.g., forwarding of positioning requests to 3G-MSC. The LCCF determines if the final positioning estimate satisfies the QoS for the purpose of retry/reject. The LCCF provides flow control of positioning requests between simultaneous positioning requests. It may order the Location Client Coordinate Transformation Function (LCCTF) to perform a transformation to local coordinates. It also generates charging and billing related data for LCS via the Location System Billing Function (LSBF).

The Location Client Authorization Function (LCAF) is responsible for providing access and subscription authorization to a client. Specifically, it provides authorization to a LCS client requesting access to the network and authorizes the subscription of a client. LCAF provides authorization to a LCS client requesting Location Information of a specific MS.

An Access Subfunction enables LCS clients to access LCS services. This subfunction provides verification and authorization of the requesting client. When a LCS is requested, the Access Subfunction uses the Information stored in the LCS client subscription profile to verify that:

the LCS client is registered; and
the LCS client is authorized to use the specified LCS request type;
the LCS client is allowed to request location information for the subscriber(s) specified in the LCS request.

The LCS client subscription profile shall contain a minimum set of parameters assigned on per LCS client basis for an agreed contractual period. The LCS client profile shall contain the following set of access parameters:

LCS client identity;
Allowed LCS request types
Maximum number of subscribers allowed in a single LCS request;
Priority;
Position override indicator;
State(s);
Event(s) (applicable to LDR requests only)
Local coordinate system;
LCS client access barring list (optional); and
PLMN access barring list applicability.

For certain authorized LCS clients internal to the PLMN, a subscription profile is unnecessary. These clients are empowered to access any defined service that is not barred for an MS subscriber. This permits positioning of emergency calls without the need for presubscription.

A Location Client Coordinate Transformation Function (LCCTF) provides conversion of a location estimate expressed according a universal latitude and longitude system into an estimate expressed according to a local geographic system understood by the LCF and known as location information. The local system required for a particular LCF will be either known from subscription information or explicitly indicated by the LCF.

Next, a system handling component is described which comprises a Location System Control Function (LSCF), a Location System Billing Function (LSBF) and a Location System Operations Function (LSOF).

The Location System Control Function (LSCF) is responsible for coordinating location requests. This function manages call-related and non-call-related positioning requests of UMTS LCS and allocates network resources for handling them. The LSCF retrieves a MS classmark for the purpose of determining a positioning method. The LSCF performs call setup if required as part of a LCS e.g. putting the ME in a dedicated mode and obtains Cell-ID. It also supplies coordinate resources and activities with regard to requests related to providing assistance data needed for positioning. This function interfaces with the LCCF, LSPF, LSBF and PRCF. Using these interfaces, it conveys positioning requests to the PRCF, relays positioning data to the LCCF and passes charging related data to the LSBF.

The Location System Billing Function (LSBF) is responsible for charging and billing activity within the network related to location services (LCS). This includes charging and billing of both clients and subscribers. Specifically, it collects charging related data and data for accounting between PLMNs.

The Location System Operations Function (LSOF) is responsible for provisioning of data, positioning capabilities, data related to clients and subscription (LCS client data and MS data), validation, fault management and performance management of UMTS LCS.

Next, a subscriber component is described which comprises a Location Subscriber Authorization Function (LSAF) and a Location Subscriber Privacy Function (LSPF).

The Location Subscriber Authorization Function (LSAF) is responsible for authorizing the provision of a location service (LCS) for a particular mobile. Specifically, this function validates that a UMTS LCS can be applied to a given subscriber. The LSAF verifies the client MS's subscription.

The Location Subscriber Privacy function is responsible for performing all privacy related authorizations. For a target mobile station MS it shall authorize the positioning request versus the privacy options of the target mobile station MS, if any.

Next, a positioning component is described, which comprises a Positioning Radio Coordination Function (PRCF), a Positioning Calculation Function (PCF), a Positioning Signal Measurement Function (PSMF) and a Positioning Radio Resource Management (PRRM).

The Positioning Radio Control Function (PRCF) manages the positioning of a mobile through overall coordination and scheduling of resources to perform positioning measurements. This function interfaces with the PSMF and PCF. The PRCF determines the positioning method to be used based on the QoS, the capabilities of the network, and the MS's location capabilities. It determines which PSMFs to be involved or what to measure, and obtains processed signal measurements from PSMF. Next, it packs the signal measurement data from the PSMF into a certain format and forwards it to the PCF.

The Positioning Calculation Function (PCF) is responsible for calculating the position of the mobile station. It obtains BTS (base transceiver station) related data, e.g., BTS geographic coordinates and stores this data. This function applies an algorithmic computation on the collected signal measurements to compute the final location estimate and accuracy. It also supports conversion of the estimate of the location of the mobile station between different geodetic reference systems.

The Positioning Signal Measurement Function (PSMF) is responsible for gathering uplink or downlink radio signal measurements for calculation of a mobile's position. These measurements can be positioning related or ancillary.

The Positioning Radio Resource Management (PRRM) entity is responsible for managing the effect of MS positioning on the overall performance of the radio network. PRRM handles following functionalities:

Controlling the variation of the power level of the UL signal (Uplink signal from mobile station to base station) and the DL signal (Downlink signal from base station to mobile station) due to the LCS application.

Calculating the DL and UL power/interference due to MS positioning to admit/reject the new LCS requests.

Cooperating with Admission Control, and PC entitles of the RRM to provide the system stability in terms of radio resources.

Controlling the RTD measurement mechanism. It may also forward the results of the RTD, ATD (or any similar timing parameter) measurements to the PCF.

Controlling the IS-DL mechanism for positioning measurements. This may include the overall control of the periodical measurements fulfilment.

Simultaneous positioning requests must be queued in a controlled manner. Possible priority differences should be taken in account, e.g. for emergency calls.

In the following, differences of the invention to GSM are described. The main architectural aspects which are different from GSM are as followings:

Basic Functional Entities allocation to reference configuration. They are allocated to WCDMA system architecture including SRNC and DRNC.

PRRM is a new entity that takes care of UL and DL signal power allocation, adjustment and variation due to positioning process. The PRRM functionality may be fulfilled in an RRM (Radio Resource Management) or the RNC (Radio Network Controller) element.

Iur related procedure used in the positioning process.

RANMAP related procedure used in the positioning process (wherein RANMAP refers to Radio Access Network Mobile Application Protocol. Recently, it is also called RANAP, i.e., Radio Access Network Application Protocol).

PRCF is allocated to RNC because of existing measurement for RNC controlling that can be use also for positioning purposes and vice versa.

PCF is allocated to RNC because of signalling traffic optimizing.

In the following, the requirements on the UMTS network elements described in connection with FIG. 5 are described partly with reference to the functionalities described in connection with FIG. 6.

The requirements on the 3G-MSC are similar to GSM, but the SMLC (Serving MLC) functionality is integrated in the SRNC. The functions of the MSC in connection with positioning are billing, coordinate, location request, authorizing and operating the location services.

The requirements on the SGSN are similar to the requirements for the MSC. The functions of SGSN are billing, coordinate, location request, authorizing and operating the location services.

Regarding the requirements on the mobile station, it is assumed that the mobile station is capable of supporting both network-based and mobile-based positioning. Therefore, the mobile station is responsible for calculating the position of the mobile while a mobile-based positioning approach is applied, gathering UL/DL radio signal measurements for calculating a position of the mobile station concerned, and supporting the logical interface between the LCS client and the LCS server. Additionally, the use of IS-Dl sets the following requirements on the mobile station:

The mobile station should be able to measure and store the signal during idle periods.

The mobile station should be able to correlate with different BCH codes between idle periods.

The mobile station needs to determine the arrival time of the first detectable path, both for the serving BTS and the other BTSs that it detects.

The mobile station must know when the idle period occurs.

The mobile station must be able to report the results back to the network.

Next, the requirements on the base station (Node B) are described. The base station (Node B) needs to be able to shut down the transmission during the idle period. This mechanism can be predefined in the functionality of the base station (NB functionality) or can be controlled by the RNC. Furthermore, the base station (Node B) should be able to handle the functionality of LMU including the functionality of a Positioning Signal Measurement Function (PSMF) and a Location System Operations Function (LSOF). Thus, it is responsible for gathering the UL/DL radio signal measurements for calculating the position of the target mobile station. The base station is also involved in the overall operation of the LCS in the system.

Next, the requirements on the RNC are described. The RNC should be able to control the TDOA IS-DL mechanism, handling the power ceasing period. The RNC should be able to handle the functionality of the Location System Operations Function (LSOF), Positioning Radio Coordination Function (PRCF), Positioning Calculation Function (PCF) and Positioning Radio Resource Management (PRRM) entities. This includes data provisioning of data, positioning capabilities, LCS operation, location calculation, managing the positioning of a mobile station through overall coordination and scheduling of resources to perform positioning measurements, and controlling the LCS radio accesses.

In the following, the requirements on the UMTS network interfaces are described.

The Iu interface should be able of transforming coordinate estimates over RANAP protocol from the RNC to the MSC/GMLS, transforming the MS positioning related NAS (Non Access Status) messages including paging, authentication, etc. Messages over the RANAP protocol, mapping the LCS QoS attributes, and handling state information between the 3G-MSC and the UTRAN.

Next, the requirement on the Iur interface is described. Generally, the main responsibility of the Iur interface is related to supporting the inter-RNC soft handover. That should also include the LCS. That is, that whenever an inter-RNC soft handover occurs, the Iur interface should be able to support the functionality of the positioning entities in RNCs, including a Positioning Calculation Function (PCF), a Positioning Radio Resource Management (PRRM), a Positioning Signal Measurement Function (PSMF) and a Location System Operations Function (LSOF). It is noted that these functions are described later in greater detail with respect to FIG. 6. In addition to that, in case of a SRNC relocation, the Iur interface should support the relocation mechanism in order that a DRNC (Drift Radio Network Controller) is able to handle the responsibility of SRNC in LCS process, that is, to transfer the PCF, PRRM, PSMF and LSOF functionality (described above with reference to FIG. 6) from SRNC to DRNC.

Furthermore, the responsibility of the Iub interface in conjunction with LCS is to support the following procedures:
  Performing TDOA IS-DL measurements periodically or in accordance with predetermined parameters,
  Performing procedures between LMU and LCS entities located in the RNC, and
  Reserving resources, including FACH/RACH or DCH for MS positioning purposes.

Next, the basic procedure according to the invention is described. Like in every positioning process, in relay based positioning the reference coordinates (base stations or MS nodes as described above) and the mobile station to be localized should be synchronized. A synchronization between BSs and MS can be achieved by using DL SCH or even TCH with screaming code, spreading factor and so on. The synchronization of the mobile station and the MS node can be done by using Calling Channel (CCH) in ODMA probing process, a mechanism used by ODMA nodes to detect neighbours which may be used as relay during a call.

After synchronization, the mobile station sends/receives its location related measurements through the MS nodes to the network by using CCH and the broadcast probes mechanism. Generally speaking, during network base positioning following steps are processed:
1. Positioninging requested from GMLC.
2. Routing information transformation between GMLC and WMSC/HLR through the MAP.
3. Providing Subscriber location between GMLC and WMSC/VLR through the MAP.
4. MS paging, authentication, Ciphering directly or through the MS nodes.
5. Location performing by using relay based positioning method and utilizing corresponding algorithms e.g. TOA, TDOA, and etc.
6. Location estimate parameter transfer between RNC and WMSC/VLR via the RANAP. Alternatively, the location estimates may be directly transferred to the OMC.

In the following, the above procedure is described for the case of a Mobile Terminated Location Request (MT-LR) Procedure for circuit switched calls with reference to FIG. 7.

First, a Location Preparation Procedure is described.

Step 1 (LSC_SERVICE_REQ): An external LCS client requests the current location of a target MS from a GMLC. The GMLC verifies the identity of the LCS client and its subscription to the LCS service requested and derives the MSISDN (Mobile subscriber ISDN) or IMSI of the target MS to be located and the LCS QoS from either subscription data or data supplied by the LCS client. For a call related location request, the GMLC obtains and authenticates the called party number of the LCS client. If location is required for more than one mobile station, or if periodic location is requested, steps 2 to 10 below may be repeated Step 2 (MAP_ROUTING_INFO): If the GMLC already knows both the 3G-MSC location and IMSI for the particular MSISDN (e.g., from a previous location request), this step and step 3 may be skipped. Otherwise, the GMLC sends a MAP_SEND_ROUTING_INFO_FOR_LCS message to the home location register HLR of the target MS to be located with either the IMSI or MSISDN of this MS.

Step 3 (MAP_ROUTING_INFO_ACK): The HLR verifies that the SCCP calling party address of the GMLC corresponds to a known GSM network element that is authorized to request MS location information. The HLR then returns the current 3G-MSC address and the IMSI and MSISDN for the particular MS.

Step 4 (MAP_MS_LOCATION): The GMLC sends a MAP_PROVIDE_SUBSCRIBER_LOCATION message to the 3G-MSC indicated by the HLR. This message carries the MS subscribers IMSI, LCS QoS (Quality of Service) information and an indication of whether the LCS client has the override capability. For a call related location request, the message also carries the LCS clients called party number. This message may optionally carry the identity of the LCS client.

Step 5 (PAGING_AUTHENTICATION_CIPHERING): If the GMLC is located in another PLMN or another country, the 3G-MSC (Mobile service center for third generation) first authenticates that a location request is allowed from this PLMN or from this country. If not, an error response is returned. If the target MS has an established circuit call other than speech, the location request is denied and an error response is returned to the GMLC. Otherwise, the 3G-MSC then verifies LCS barring restrictions in the MS user's subscription profile in the VLR (Visitor Location Register). If the LCS is barred and a LCS client accessing a GMLC in the same country does not have the override capability (i.e., is allowed to perform the LCS anyway), an error response is returned to the GMLC. Otherwise, if the MS is in an idle mode, the VLR performs paging, authentication and ciphering. This procedure may provide the MS user's current cell ID and Timing Alignment/Radio Interface Synchronization value in the RANAP layer 3 Information used to convey the Paging Response. If the MS is instead in a dedicated mode, the 3G-MSC will have been supplied with the current cell ID from either the serving BSC (base station controller) or serving MSC (mobile switching center) in the case of an established call with inter 3G-MSC handover.

It is to be noted that in parallel with or after performing any basic procedure i.e. paging, authentication etc., a signalling setup link should be performed. It is assumed that common channels like RACH/FACH and paging channel are preferably used for LCS purpose.

Step 6 (RANAP_PERFORM_LOCATION): The 3G-MSC sends a RANAP_PERFORM_LOCATION message to the SRNC. This message includes the MS's location capabilities and requested OoS.

Next, the positioning measurement establishment procedure is described.

Step 7 If the requested location accuracy within the QoS can be satisfied, the SRNC may send a RANAP_PERFORM_LOCATION_ACK immediately. Otherwise, the SRNC determines the positioning method and instigates the particular message sequence for this method. Especially, here the method described above with reference to FIGS. 2 to 4 can be used. If the positioning method returns position measurements, the SRNC uses them to compute a location estimate. If there has been a failure to obtain position measurements, the SRNC may use the current cell ID and a TA/RIS (Timing Advance/Radio Interface Synchronization, e.g. frame timing offset) value to derive an approximate location estimate. If an already computed location estimate is returned for an MS based positioning method, the SRNC may verify consistency with the current cell ID and TA/RIS value. If the location estimate so obtained does not satisfy the requested accuracy and sufficient response time still remains, the SRNC may instigate a further location attempt using the same or a different positioning method.

Additionally, if the IS-DL is concerned, the SRNC may send a message to the BS/Node B to indicate the power cease period of the BSs involved in the positioning process. Alternatively, this can be a part of basic functionality of the BSs.

Next, a location calculation and release procedure is described.

Step 8 (RANAP_PER_LOCATION_ACK): When a location estimate best satisfying the requested QoS has been obtained, the SRNC returns it to the 3G-MSC or OMC.

Step 9 (MS_LOCATION_ACK): The 3G-MSC returns the location estimate to the GMLC. The VLR (visitor location register) may then release the Mobility Management (MM) connection to the MS, if the MS was previously idle, and the 3G-MSC may record billing Information.

Step 10 (LCS_SERVICE_RESPOND): The GMLC returns the MS location estimate to the requesting LCS client. If the LCS client requires it, the GMLC may first transform the universal location coordinates provided by the 3G-MSC, into some local geographic system. The GMLC may record billing for both the LCS client and inter-network revenue charges from the 3G-MSC's network.

In the following, a mobile originated location request (MO-LR) for circuit calls is described with reference to FIG. 8.

Steps 1 to 4 form a location preparation procedure.

Step 1 (CM_SERVICE_REQUEST). An initially idle MS requests an RACH (random access channel) and sends a CM (Connection Management) Service Request indicating a request for an MOC (mobile originated call) to the 3G-MSC via the RNC (radio network controller).

Step 2 (RANAP_CM_SERVICE_REQUEST): The RNC includes the current cell ID and within the RANAP Complete Layer 3 Information message used to convey the CM service request across the Iu-interface. The MS may identify itself using a TMSI, IMSI, IMEI, etc.

Step 3 (AUTHENTICATION_CIPHERING): The 3G-MSC, RNC and MS continue the normal procedure for authentication and ciphering. Depending on local regulatory requirements, the sending of call setup information into the PSTN may be delayed until either the MS's location has been obtained or the location attempt has failed or a PLMN defined timer has expired before location was obtained. Call setup information sent into the PSTN may include the MS location (if already obtained) plus information that will enable, for instance, the emergency service provider to request MS location at a later time.

Step 4 (RANAP_PERFORM_LOCATION_ACK): At any time after step 1, the 3G-MSC may initiate procedures to obtain the MS's location. These procedures may run in parallel with the MO-LR call origination. The 3G-MSC sends a RANAP_PERFORM_LOCATION message to the SRNC associated with the MS's current location area. This message includes the MS's location capabilities and the QoS required for an emergency call and the current Cell ID, timing offset, etc.

The following step 5 forms a positioning measurement establishment procedure.

Step 5 If the requested location accuracy is sufficient (i.e., within the QoS), the SRNC may send a RANAP_PERFORM_LOCATION ack. immediately. Otherwise, the SRNC determines the positioning method and instigates the particular message sequence for this method defined in subsequent sections. If the positioning method returns position measurements, the SRNC uses them to compute a location estimate. If there has been a failure to obtain position measurements, the SRNC may use the current cell ID or MS's latest location information to derive an approximate location estimate. If an already computed location estimate is returned for an MS based positioning method, the SRNC may verify consistency with the current cell ID. If the location estimate so obtained does not satisfy the requested accuracy and sufficient response time still remains, the SRNC may instigate a further location attempt using the same or a different positioning method.

The following steps 6 to 8 form a location calculation and release procedure.

Step 6 (RANAP_PER_LOCATION_ACK): When a location estimate best satisfying the requested QoS has been obtained, the SRNC returns it to the 3G-MSC over Iu interface.

Step 7 (CM_LCS_REQUEST_ACK.): The 3G-MSC responds to the MS positioning request by sending a CM Service Request acknowledgement for an MOC (mobile originated call) to the MS.

Step 8 (MAP_SUBSCRIBER_LCS_RESPO): Depending on local regulatory requirements, the 3G-MSC may send a MAP Subscriber Location report to a GMLC. This message shall carry any location estimate returned in step 6 and may carry the MSISDN, IMSI and IMEI of the calling MS. Additionally, the GMLC may optionally forward any information received in step 9 to the LCS client.

It is to be noted that in case of positioning of emergency call, step 3 of the pervious sequence is naturally omitted.

Figure 7:
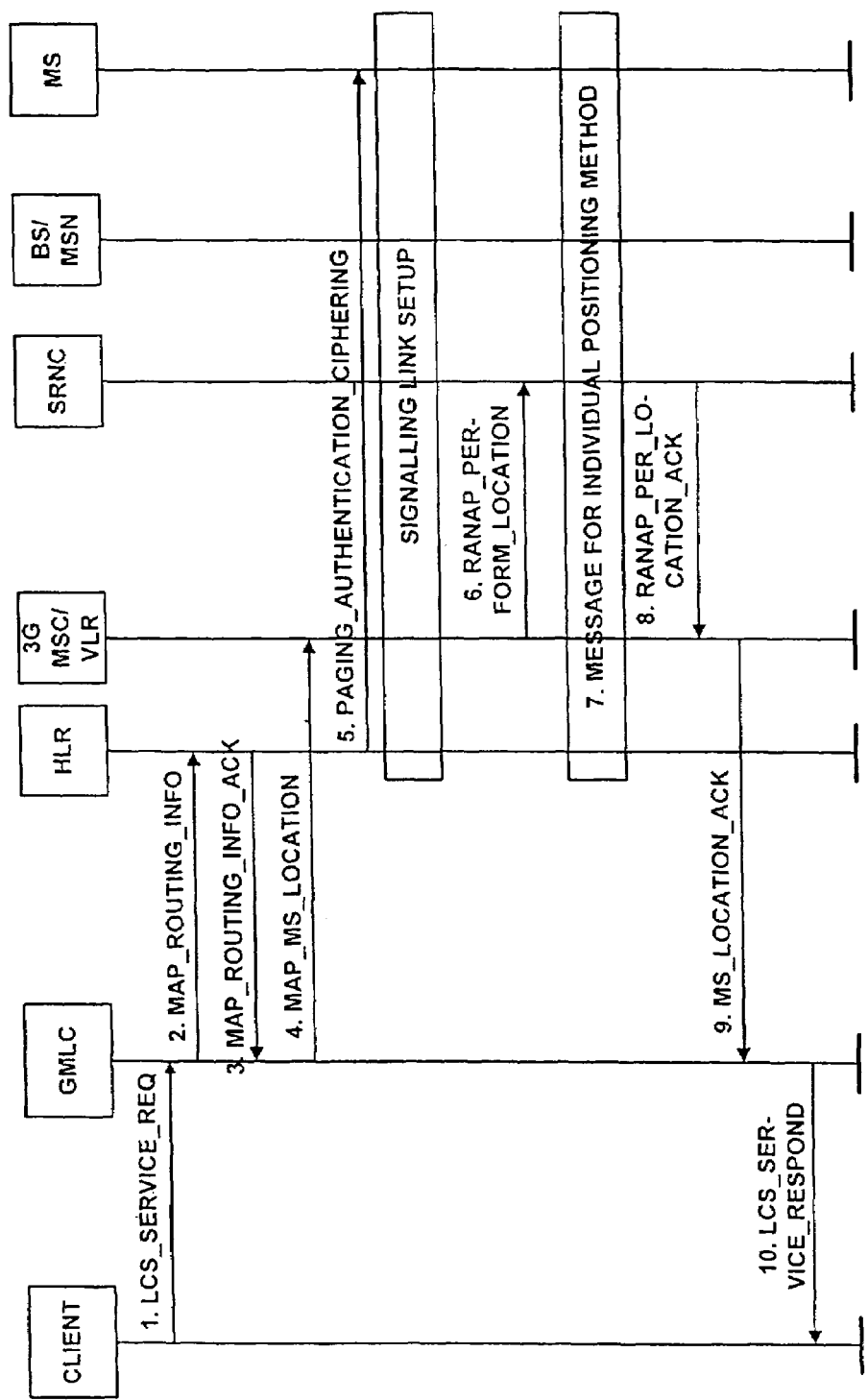
FIG. 7 illustrates a process of a general network positioning for an MT-LR.
Figure 8:
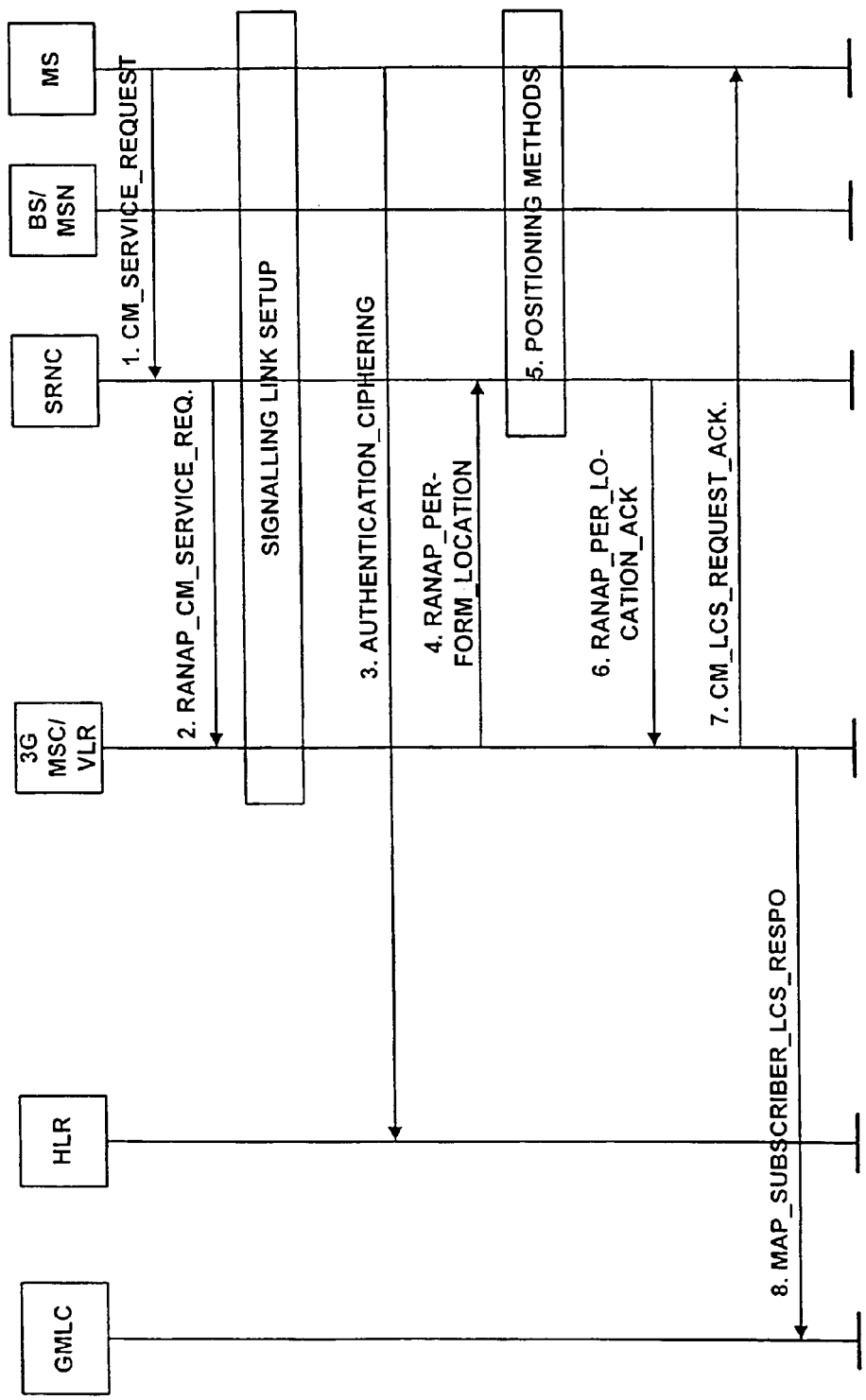
FIG. 8 illustrates a process of positioning for an MO-LR Request.

The above described preferred embodiment of the invention has been described with respect to circuit switched calls by referring to FIGS. 7 and 8. However, the method according to the invention is also applicable to packet switched calls.

In case of a packet switched, mobile terminated location request (MT-LR), the general procedure therefor is in principle the same as that shown in FIG. 7.

Furthermore, in case of a packet switched, mobile originating location request (MO-LR), the general procedure is in principle the same as that shown in FIG. 8, except that no connection management (CM) but a session management (SM) is performed, such that the corresponding steps are accordingly modified.

Moreover, if during the positioning procedure base stations are concerned which are not connected by the above mentioned Iur interface, the following approach may be applied: If during the positioning process the concerned mobile station belongs to a handover active set and it may soon be handed over, then location measurement information may be transferred via the anchor 3G-MSC to the target base station (or RNC), to which the mobile station will be accessed. If the mobile station does not belong to the handover active set, that is, that it will not be handed over soon, then parameters required for a positioning calculation (e.g., coordination of neighbouring base stations, synchronization, etc.) related to the neighbouring base station(s) could be transferred from the neighbouring base station (or RNC) to the serving RNC (or corresponding element responsible for location calculating) via the anchor and serving 3G-MSCs. This solution is also applicable to a GSM system in which BSCs (Base Station Controllers) are not connected to each other at all.

By the above method, it is possible to locate a mobile station even if there is no any LOS (Line of Sight), i.e., a direct connection via air, from neighbouring base stations. As described above, this is achieved by utilizing the ODMA relay technique in WCDMA. ODMA is already evaluated by ETSI and is defined as a very potential solution for WCDMA coverage extension particularly when there is no LOS due to shadowing and so on.

Moreover, by the method according to the present invention it is possible to locate a mobile station by one or two LOS (Line of Sight) from neighbouring base stations without any special antenna or additional complexity to the mobile station or the base station.

Furthermore, the interference due to positioning process are reduced. This is a vital issue for WCDMA, since WCDMA is a very interference dependent multiple access.

In addition, the method according to the invention is a potential complementary to other existing positioning methods.

Moreover, it is based on relay technology that has been already evaluated as a potential solution for WCDMA performance. Thus, the method according to the invention can easily be implemented in existing systems.

The invention claimed is:

1. A method for locating a mobile station in a mobile telecommunication system comprising the steps of:
   using fixed transmitting stations for positioning a target mobile station by transmitting a location signal from each fixed transmitting station to said target mobile station and receiving a response to said location signal from said target mobile station by said fixed transmitting stations,
   using at least one relay station which is configured to receive said location signal from the corresponding fixed transmitting station and said response from said target mobile station, and to forward said location signal and said response to said target mobile station and said fixed transmitting stations, respectively, in case a direct transmission from or to at least one of said fixed transmitting stations is not available,
   determining a position of said at least one relay station,
   determining a distance between said target mobile station and the fixed transmitting stations and/or the at least one relay station on a basis of said location signal, and
   locating a position of said target mobile station on a basis of the determined distances,
   wherein said at least one relay station is a movable mobile station, and wherein a distance D between said at least one relay station and said target mobile station is calculated based on the following equation $D = c\Delta t + \beta d\mathrm{max}$, wherein c is a light velocity, $\Delta t$ is a propagation delay of the location signal, $\beta$ is in a range from $-1$ to $+1$, and dmax is a maximum distance by which the at least one relay station can move during $\Delta t$.

2. The method according to claim 1, wherein said distance dmax is determined by the following equation:

$d\mathrm{max} = v\mathrm{max}\Delta t + e$, wherein vmax is a maximum velocity of the at least one relay station and e is a measurement error.

3. The method according to claim 1, comprising the step of judging whether a request for a location of said target mobile station is authorized or not.

4. The method according to claim 3, wherein for said judging step subscriber data of a data base are used.

5. The method according to claim 1, comprising the step of synchronizing said fixed transmitting stations and said target mobile station involved in the positioning before performing said locating step.

6. The method according to claim 1, wherein the calculation of the location of said target mobile station is performed on a basis of any positioning method based on radio wave propagation data.

7. The method according to claim 6, wherein said positioning method based on radio wave propagation data is one of TDOA, TOA and TA.

8. The method according to claim 1, wherein said method is carried out in a WCDMA network.

9. The method according to claim 1, wherein each positioning request is provided with a priority level and, in case of a plurality of simultaneous positioning requests, the plurality of simultaneous positioning requests are processed in dependence on the priority level.

10. The method according to claim 1, wherein Opportunity Driven Multiple Access (ODMA) is used as a protocol for transmitting said location and response signals via said at least one relay station.

11. A radio network of a mobile telecommunication system, comprising:
    fixed transmitting stations which are configured for positioning a target mobile station by transmitting a location signal from each fixed transmitting station to said target mobile station and receiving a response to said location signal from said target mobile station by said fixed transmitting stations,
    at least one relay station which is configured to receive said location signal from the corresponding fixed transmitting station and said response from said target mobile station, and to forward said signals to said target mobile station and said fixed transmitting station, respectively, in case a direct transmission from and to at least one of said fixed transmitting stations is not available, and
    location means for determining a position of the at least one relay station and determination means for determining a distance between said target mobile station and the fixed transmitting stations and/or the at least one relay station on a basis of said location signal, and wherein the location means is configured to locate the position of said target mobile station on a basis of the determined distances,
    said at least one relay station is a movable mobile station, and
    said determination means calculates said distance D between said at least one relay station and said target mobile station based on the following equation $D = c\Delta t\ \beta d\mathrm{max}$, wherein c is the light velocity, $\Delta t$ is a propagation delay of the location signal, $\beta$ is in a range from $-1$ to $+1$, and dmax is a maximum distance by which the at least one relay station can move during $\Delta t$.

12. The radio network according to claim 11, wherein said determination and location means is a mobile location center.

13. The radio network according to claim 11, wherein said distance dmax is determined by the following equation:

$$d\max = v\max \Delta t + e,$$

wherein vmax is a maximum velocity of the at least one relay station and e is a measurement error.

14. The radio network according to claim 12, wherein said mobile location center is further configured to judge whether a request for a location of said target mobile station is authorized or not.

15. The radio network according to claim 14, wherein said mobile location center is configured to use subscriber data of a data base (HLR).

16. The radio network according to claim 11, wherein said radio network is a WCDMA network.

17. The radio network according to claim 11, wherein each positioning request is provided with a priority level and in case of a plurality of simultaneous positioning requests, said mobile location center is configured to process the plurality of simultaneous positioning requests in dependence on the priority level.

18. The radio network according to claim 11, wherein Opportunity Driven Multiple Access (ODMA) is used as a protocol for transmitting said location signal via said at least one relay station.

* * * * *